US011339853B2

(12) United States Patent
Ledwon et al.

(10) Patent No.: US 11,339,853 B2
(45) Date of Patent: May 24, 2022

(54) TRANSMISSION

(71) Applicants: Anton Ledwon, Troisdorf (DE); Waldemar Lewtschenko, Hennef (DE)

(72) Inventors: Anton Ledwon, Troisdorf (DE); Waldemar Lewtschenko, Hennef (DE)

( * ) Notice: Subject to any disclaimer, the term of this patent is extended or adjusted under 35 U.S.C. 154(b) by 0 days.

(21) Appl. No.: 16/976,528

(22) PCT Filed: Feb. 15, 2019

(86) PCT No.: PCT/EP2019/053781
§ 371 (c)(1),
(2) Date: Aug. 28, 2020

(87) PCT Pub. No.: WO2019/166237
PCT Pub. Date: Sep. 6, 2019

(65) Prior Publication Data
US 2020/0408281 A1 Dec. 31, 2020

(30) Foreign Application Priority Data

Mar. 2, 2018 (DE) .................... 10 2018 104 758.4

(51) Int. Cl.
*F16H 1/28* (2006.01)
*F16H 57/08* (2006.01)
(Continued)

(52) U.S. Cl.
CPC ............ *F16H 1/28* (2013.01); *F16H 57/082* (2013.01); *F16H 3/724* (2013.01); *F16H 37/041* (2013.01); *F16H 2001/2881* (2013.01)

(58) Field of Classification Search
CPC . F16H 1/28; F16H 57/082; F16H 3/58; F16H 3/60
See application file for complete search history.

(56) References Cited

U.S. PATENT DOCUMENTS 2,764,033 A 9/1956 Lane
2018/0051782 A1* 2/2018 Roske .................... F16H 3/666

OTHER PUBLICATIONS

Gumpoltsberger Gerhard. "Systematsiche Synthese und Bewertung von mehrgangigen Plantengetrieben" In: Systematsiche Synthese und Bewertung von mehrgangigen Plantengetrieben, Fakultat fur Maschinenbau der Technischen Universitat Chemnitz , Aug. 7, 2007 (Aug. 7, 2007), XP055390879.
(Continued)

*Primary Examiner* — Derek D Knight
(74) *Attorney, Agent, or Firm* — Burr & Forman LLP; Douglas L. Lineberry

(57) ABSTRACT

The invention relates to a transmission (1) with a transmission input and a transmission output, with a main gearwheel, which is interposed between the transmission input and the transmission output and which is rotatably mounted about a rotation axis (20) and to which a gearwheel bearing (17) is assigned that can be moved perpendicularly to the rotation axis (20), with a gearwheel drive (21), which serves for rotating the main gearwheel about the rotation axis and with which the main gearwheel (19) is in engagement in an engagement zone (26), and with a gearwheel bearing drive (14), which serves for moving the gearwheel bearing (17) (17). When a torque is input at the transmission input, the gearwheel drive (21) rotates the main gearwheel (19) about the rotation axis. The gearwheel bearing drive (14) causes a movement of the engagement zone (26), wherein the movement of the engagement zone (26) and a circumferential movement of the main gearwheel (19) in the engagement zone (26) are oriented in opposite directions.

13 Claims, 9 Drawing Sheets

Figure 1:
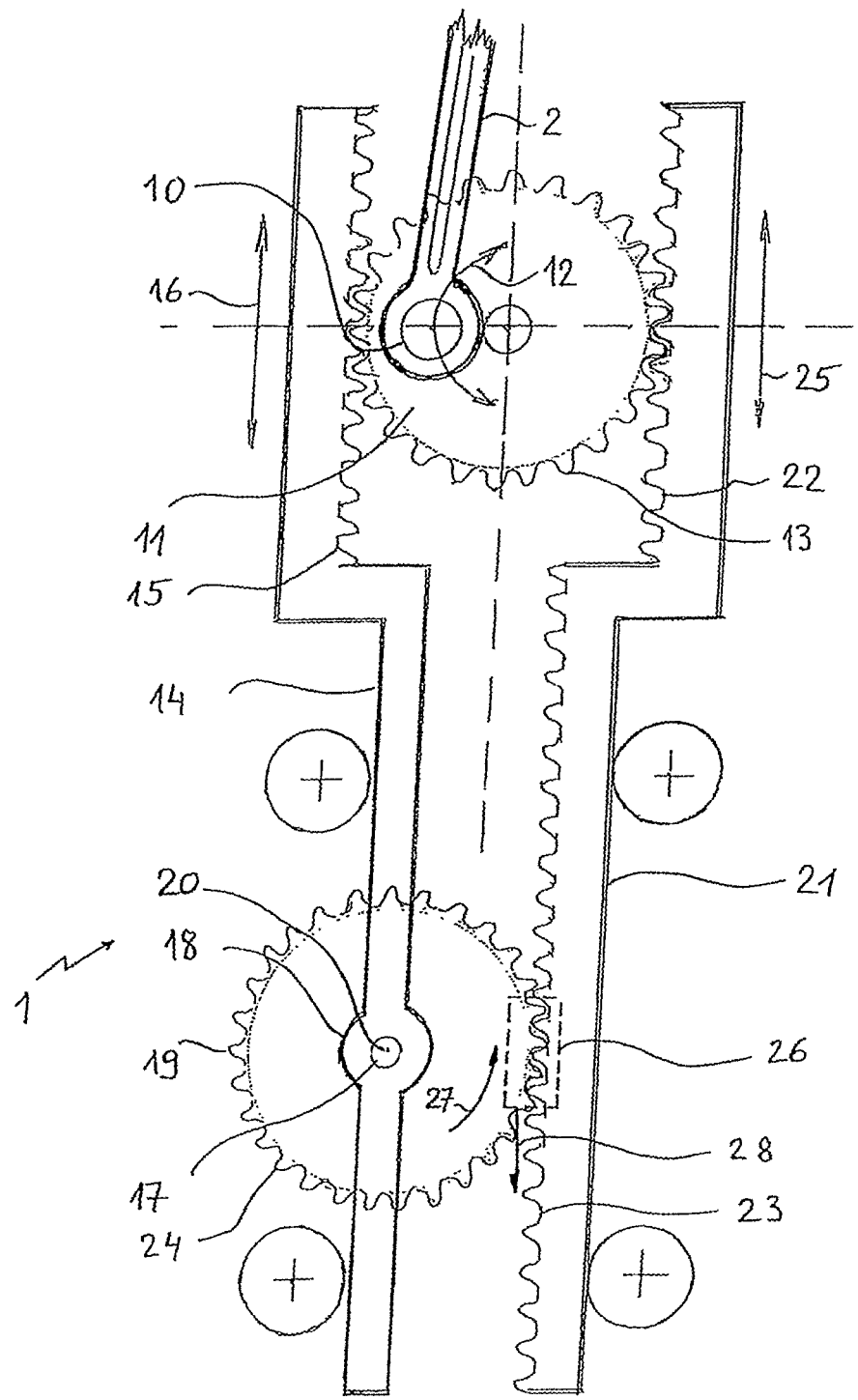

(51) Int. Cl.
*F16H 3/72* (2006.01)
*F16H 37/04* (2006.01)

(56) References Cited

OTHER PUBLICATIONS

Florian Mulzer. "Systematik hoch tibersetzender koaxialer Getriebe" May 26, 2010 (May 26, 2010), Retrieved from the Internet:https://d-nb.info/1003233759/34 [retrieved on Jun. 21, 2019] XP055598364.

* cited by examiner

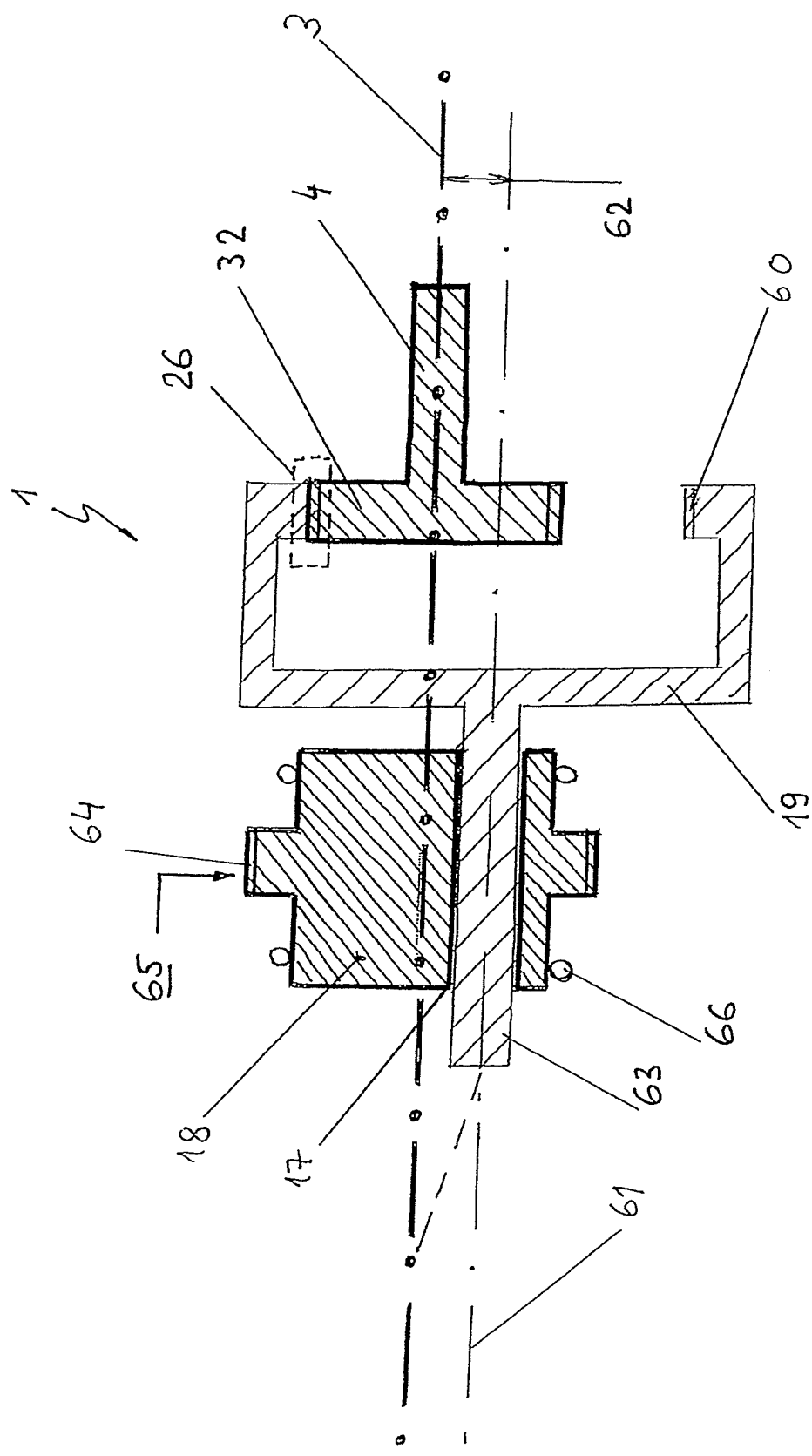

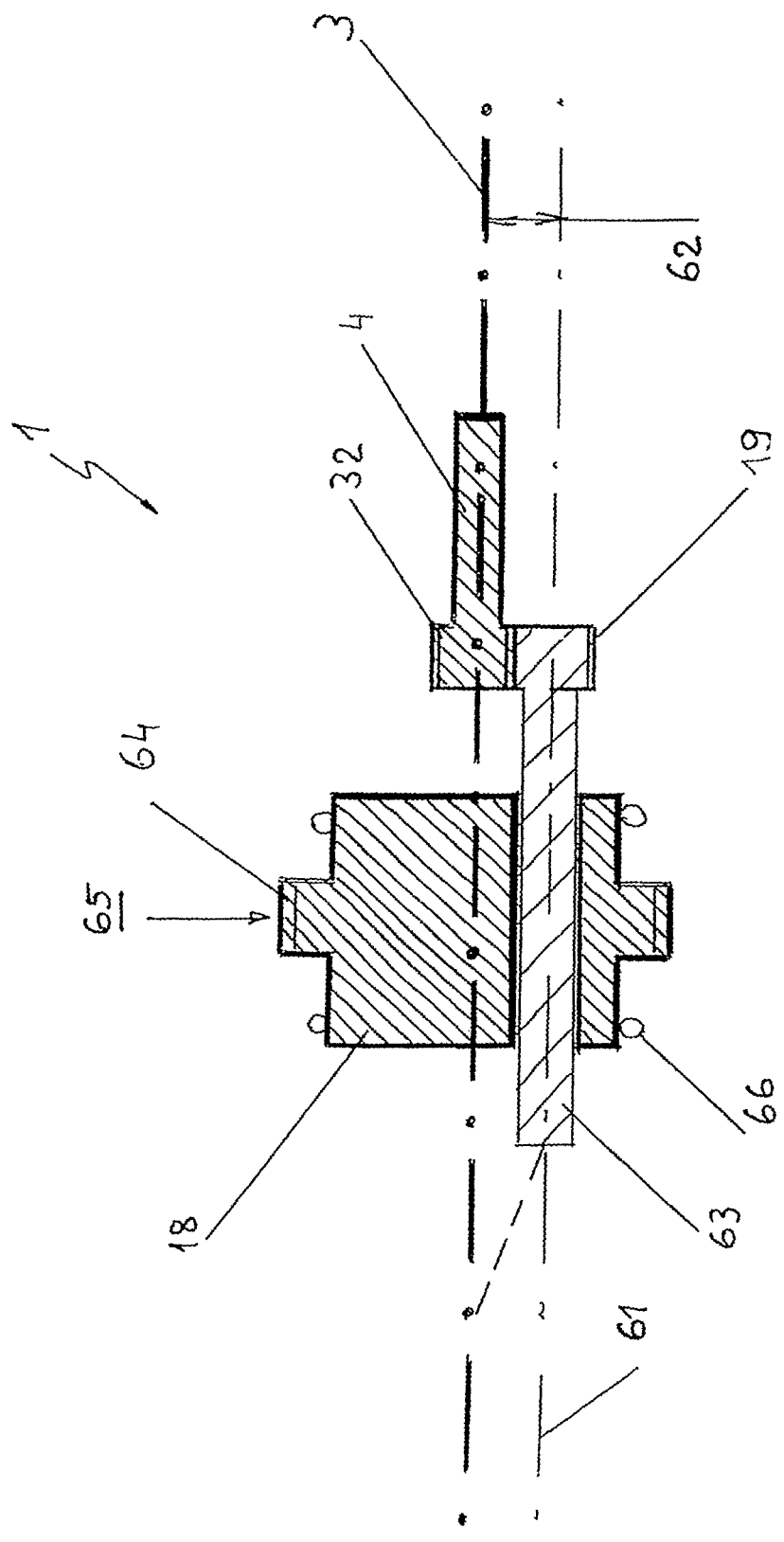

TRANSMISSION

The invention relates to a transmission with a transmission input and with a transmission output, with a main gearwheel, which is interposed between the transmission input and the transmission output and which is rotatably mounted about a rotation axis and to which a gearwheel bearing is assigned that can be moved perpendicularly to the rotation axis.

Such a transmission is known in the form of a planetary gear train, for instance, wherein the main gearwheel in this case constitutes a planet gearwheel of the planetary gear train. Here, the planet gearwheel meshes with a sun gearwheel and a ring gearwheel disposed coaxially therewith. The planet gearwheel or a plurality of planet gearwheels disposed between the sun gearwheel and the ring gearwheel are rotatably mounted in a planet gearwheel carrier. The planet gearwheel carrier can be rotated about a central axis, like the ring gearwheel and the sun gearwheel. The rotation axes of the individual planet gearwheels extend parallel thereto. A rotation of the planet gearwheel carrier about the central axis causes the gearwheel bearings of the planet gearwheels to be moved in the circumferential direction, i.e. perpendicular to the central axis or to the rotation axis of the individual planet gearwheels. If, for example, the transmission output is connected to the sun gearwheel and the transmission input to the planet gearwheel carrier, then, provided the ring gearwheel is fixed and a rotation is input via the transmission input at the input shaft, a rotation of the planet gearwheel carrier in the same direction of rotation and a different speed of rotation can be generated. Coupling the ring gearwheel with the transmission input or transmission output and fixing the sun gearwheel or the planet gearwheel carrier in order to obtain a different transmission ratio and, if necessary, a reversal of the direction of rotation, is also known.

The ratio of the speed of rotation of the transmission output and the speed of rotation of the transmission input depends on the diameter ratios of the individual gearwheels that are in engagement in the transmission. If particularly small gearwheels are in engagement with comparatively large gearwheels, large forces may arise in the transmission. Certain transmission ratios may therefore be accompanied by large forces.

Therefore, the invention is based on the object of providing a transmission with a certain transmission ratio in which the level of the forces arising is kept as low as possible.

The object on which the invention is based is achieved with the combination of features according to claim 1. Exemplary embodiments of the invention are apparent from the dependent claims.

The transmission according to the invention comprises a gearwheel drive, which serves for rotating the main gearwheel about the rotation axis and is in engagement with the main gearwheel in an engagement zone, and a gearwheel bearing drive, which serves for moving the gearwheel bearing or for displacing the rotation axis of the main gearwheel. When a driving torque is input on the input side, the gearwheel drive rotates the main gearwheel about the rotation axis. In the process, the gearwheel bearing drive causes a movement of the engagement zone, wherein the movement of the engagement zone and a circumferential movement of the main gearwheel in the engagement zone, which is caused by the rotation about the rotation axis, are oriented in opposite directions. By this action (rotating the main gearwheel and simultaneously displacing the rotation axis of the main gearwheel), the speed of rotation of the main gearwheel is increased in absolute terms. In this case, the main gearwheel may also be referred to as a rotational speed-increasing gearwheel. Thus, an increase in the speed of rotation is also possible without smaller gearwheel diameters.

It is also possible, in principle, that the circumferential movement of the main gearwheel and the engagement zone are oriented in the same direction. This leads to a resultant rotation of the main gearwheel that is smaller than the main gearwheel's own rotation.

In the claimed variant, in which the movement of the engagement zone and the circumferential movement of the main gearwheel in the engagement zone are opposite, a part of the torque input into the transmission via the input shaft is used for the main gearwheel's own rotation (rotation about its own axis/rotation axis). Another part of the torque is used for the movement of the gearwheel bearing or the displacement of the rotation axis, wherein the own rotation and the displacement of the rotation axis result in rotations of the main gearwheel in the same direction.

The gearwheel bearing drive can cause a circular movement of the gearwheel bearing. The rotation of the main gearwheel about the rotation axis and the circular movement of the gearwheel bearing may have the same direction of rotation. The movement of the gearwheel bearing may also be a linear movement. In addition, the movement of the gearwheel bearing may be composed of a circular movement and a linear movement.

The gearwheel bearing drive may comprise a rotating or a linearly moving gearwheel carrier. In this case, the gearwheel carrier may have a bore or recess for accommodating the gearwheel bearing for the main gearwheel. In this case, the main gearwheel is mounted so as to rotate within the gearwheel carrier or relative thereto.

The transmission may comprise a carrier shaft on which the main gearwheel is seated and which is rotatable relative to the gearwheel carrier. In this case, the main gearwheel may be non-rotatably attached to the carrier shaft. It is also possible that the main gearwheel is rotatably seated on the carrier shaft.

The main gearwheel may mesh with a main drive gearwheel which is preferably non-rotatably seated on an input shaft of the transmission. A diameter of the main gearwheel and a diameter of the main drive gearwheel may be equal. If the movement of the engagement zone (here: the contact zone between the main gearwheel and the main drive gearwheel) and the circumferential movement of main gearwheel in the engagement zone are oriented in opposite directions, the main gearwheel rotates faster than the main drive gearwheel because the resultant rotation of the main gearwheel is composed of its own rotation and the circular movement of the gearwheel bearing.

The gearwheel bearing drive may be in engagement with a bearing drive gearwheel, which is preferably seated on the input shaft. Viewed in the axial direction of the input shaft, the bearing drive gearwheel and the main drive gearwheel may be disposed side-by-side. The bearing drive gearwheel and the main drive gearwheel may be, for example, a stepped gearwheel. However, the diameters of the two gearwheels may also be the same. It is also possible that the bearing drive gearwheel and the main drive gearwheel coincide to form a single wheel or gearwheel. In this case, the bearing drive gearwheel or the main drive gearwheel on the one hand meshes with the main gearwheel and, on the other hand, is in engagement with the gearwheel bearing drive, which provides for the movement of the gearwheel bearing of the main gearwheel.

The bearing drive gearwheel may be configured as the first chain gearwheel of a chain drive. The chain drive further comprises a second chain gearwheel and a chain connecting the first chain gearwheel to the second chain gearwheel. In this case, the second chain gearwheel may be non-rotatably seated on the carrier shaft on which the main gearwheel is also seated, preferably axially spaced apart therefrom. In this case, the second chain gearwheel and the chain of the chain drive may be considered a part of the gearwheel bearing drive so that accordingly, the gearwheel bearing drive is in engagement with the bearing drive gearwheel.

The gearwheel bearing drive may have a stationary ring gearwheel and a circulating gearwheel meshing with the ring gearwheel. In this case, the circulating gearwheel may be seated on the carrier shaft and ensures that the carrier shaft or the gearwheel carrier circulates about a rotation axis different from the carrier shaft rotation axis.

In an alternative exemplary embodiment, the circulating gearwheel meshes not only with the ring gearwheel but also with the main gearwheel, which can mesh with the main drive gearwheel at the same time. In this case, the gearwheel bearing drive may have a rod-shaped gearwheel carrier, with the rotation axes of the main drive gearwheel, the main gearwheel and the circulating gearwheel being located on a straight line, which, within the internal toothing of the ring gearwheel, extends radially outwards from the ring gearwheel axis.

In one exemplary embodiment, the gearwheel bearing drive comprises a countershaft with a stationary rotation axis, which preferably extends parallel to the input shaft and carries a gearwheel meshing with the bearing drive gearwheel on the input shaft.

Another gearwheel, which is in engagement via an intermediate gearwheel with a sprocket that is part of the gearwheel carrier, may be disposed on the countershaft. Thus, the gearwheel carrier rotates about a rotation axis which preferably coincides with the rotation axis of the input shaft.

Alternatively, the gearwheel meshing with the bearing drive gearwheel may mesh with an internal toothing of the gearwheel carrier. Thus, the gearwheel carrier may in principle have the form of a circulating ring gearwheel which, spaced apart from the rotation axis of the ring gearwheel, carries along the carrier shaft.

The main gearwheel may be connected to the transmission output, preferably comprising an output shaft, via a cardan shaft. In this case, the cardan shaft may include a first universal joint for connection to the main gearwheel or the carrier shaft and a second universal joint for connection to the output shaft.

Preferably, a rotation axis of the output shaft and the rotation axis of the input shaft are arranged so as to be aligned with one another.

An intermediate gearwheel may be provided between the main gearwheel and the output shaft, so that the main gearwheel and the output shaft rotate in the same direction of rotation. In this case, the main gearwheel may mesh with an intermediate gearwheel, which in turn meshes with a gearwheel on the output shaft. Thus, a torque flow between the main gearwheel and the output shaft is realized. Alternatively, another gearwheel meshing with the intermediate gearwheel may be provided, which, axially spaced apart from the main gearwheel, is seated on the carrier shaft and is non-rotatably connected to the main gearwheel.

In one exemplary embodiment, when a torque is input at the output side, the main gearwheel substantially imparts no torque to the gearwheel drive. Thus, the transmission functions as a freewheel transmission, which transmits a rotational output from the transmission input to the transmission output, but not in the reverse direction. Thus, the transmission may be mounted upstream of a flywheel, which is driven via the transmission output by angular momentum present at the transmission input, or whose speed of rotation is kept constant or accelerated. Due to the freewheel, however, the flywheel is not decelerated when a decelerating momentum is applied to the transmission input. Irrespective of the speed of rotation of the transmission output, every angular momentum on the transmission input drives the flywheel. Thus, a device is disclosed which comprises the transmission according to the invention and a flywheel or a medium absorbing/storing rotational energy, wherein the flywheel/medium is connected to the transmission output and the transmission input serves for inputting angular momentum or angular impulses into the transmission for driving the flywheel/medium.

Another object of the invention, i.e. providing a transmission with a first transmission input, a second transmission input and a transmission output, is achieved with the combination of features according to claim 14.

The transmission according to claim 14 has a main gearwheel, which is rotatable about a rotation axis and to which a gearwheel bearing is assigned. The gearwheel bearing can be moved perpendicularly to the rotation axis. A gearwheel drive is provided for rotating the main gearwheel about its rotation axis.

Which is in engagement with the main gearwheel in an engagement zone. A gearwheel bearing drive serves for moving the gearwheel bearing. When a first torque is input at the first transmission input, the gearwheel drive rotates the main gearwheel about its rotation axis. A second torque at the second transmission input drives the gearwheel bearing drive, whereby the position of the engagement zone is changed. The movement of the engagement zone and a circumferential movement of the main gearwheel in the engagement zone may be oriented in the opposite or the same direction.

If the torques at the transmission input are set in such a way that the movement of the engagement zone and the circumferential movement of the main gearwheel having an external toothing are oriented in opposite directions, then the torques add up so that the main gearwheel rotates more rapidly in total. The main gearwheel's own rotation about its rotation axis and the preferred rotation of the gearwheel bearing of the main gearwheel in that case result in an altogether greater total rotation of the main gearwheel that is available at the transmission output.

For example, the first transmission input may be used for inputting a permanently acting torque, whereas a pulse-like energy can be inputted into the second transmission input. The pulse-like energy in that case results in an acceleration of the main gearwheel or of the transmission output, without the pulse-like energy having to be applied with a certain speed of rotation in the process. If the transmission according to the invention is part of an electrically driven bicycle, an electric motor may provide for the permanent drive (e.g. for a speed of 15 km/h), with the pulse-like energy being provided by the muscle strength of the cyclist. In the process, the cyclist may also pedal with a lower cadence irrespective of the speed of rotation of the electric motor. The pulse-like energy may also be a stored energy which is released abruptly (e.g. relaxation of a tight spring). Thus, solar energy may be stored and used at a higher mechanical level.

Even though, in a preferred embodiment, the torques at the transmission inputs are supposed to supplement each other in order to be able to pick up a greater total power at the transmission output, the torque at the second transmission input may also be a negative torque which may be converted into electrical energy. The movement of the engagement zone, and thus the ratio of the speed of rotation at the first transmission input to the speed of rotation at the transmission output, can be adjusted by means of the size of the (rotational) resistance of the gearwheel bearing drive.

Possible applications are:

1. Driving by two or more drive sources without torque loss and independent of speed of rotation and action time.
2. Auxiliary driving by stored pulse-like energy
3. Driving from a single energy source, distributed to two or more outputs with different torques at the same time. Also vice versa.
4. Conversion of slip-off energy (support point displacement) into electrical energy when starting.
5. Conversion of slip-off energy (support point displacement) into electrical energy when accelerating.
6. Conversion of braking energy into electrical energy when operating the brake pedal and during negative acceleration
7. Automatic switching of rotational energy for rotational force transmission to different outputs in the case of controlled load change, as well as in the case of random load change
8. Rotational energy transmission from one drive to an output via two directions (delayed) feedback in this case is always 1:1. The energy is transmitted without torque loss (in the dynamic state).

Regarding 1

The main drive is permanently in action (connected to load). At the same time, one or several drives with different speeds of rotation may be added. The speed of rotation on the output shaft is increased by the added energy source without torque loss. The feedback from the output shaft remains at 1:1 for each drive. Thus, a second drive in a vehicle, e.g. by using muscle strength, can bring the main drive to a higher output speed with an additional path. The addition of the speed of rotation is independent of the two drive speeds.

Regarding 2

Wind power is the main drive, for example, and solar energy is only temporarily provided, or only on a low level due to the weather. In this case, the small effect of the solar energy may be stored as mechanical energy and supplied through the option of the second drive, and vice versa.

Regarding 3, 4, 5, 6

An energy is routed through a drive shaft and then divided with a direct transfer and, at the same time, an indirect transfer by displacing the support point. So far, the speed of rotation of the motor needs to be increased when accelerating the vehicle in order to overcome the inertia of the mass and accelerate the vehicle. The inertia of the mass results in a delay from stepping on the accelerator to the actual acceleration. This leads to a considerable increase with regard to exhaust gases.

If the summation transmission is used, the support point is displaced and the forces distributed in at least two directions when the main drive accelerates. Thus, the summation transmission behaves like a transmission, but without the toothing decoupling during the gearshift process. When the accelerator is operated, the energy is transmitted and used without delay and without a change in toothing. This system works without a wearing clutch, but with an electromagnetic load and support point displacement. Thus, electrical energy is recovered during every acceleration process (the energy otherwise partially associated with wear is converted into electrical energy).

In case of negative acceleration, the system behaves the same but in reverse. That is, energy comes from the wheels and not from the motor.

Regarding 8

The rotational energy of the drive source is shifted in time by automatic switching and routed towards two drive shafts. One drive shaft routes the rotation force directly to the output shaft, and the other indirectly by displacing the support point in the direction of rotation. One of the two drive shafts is equipped with a disk flywheel.

Figure 2:
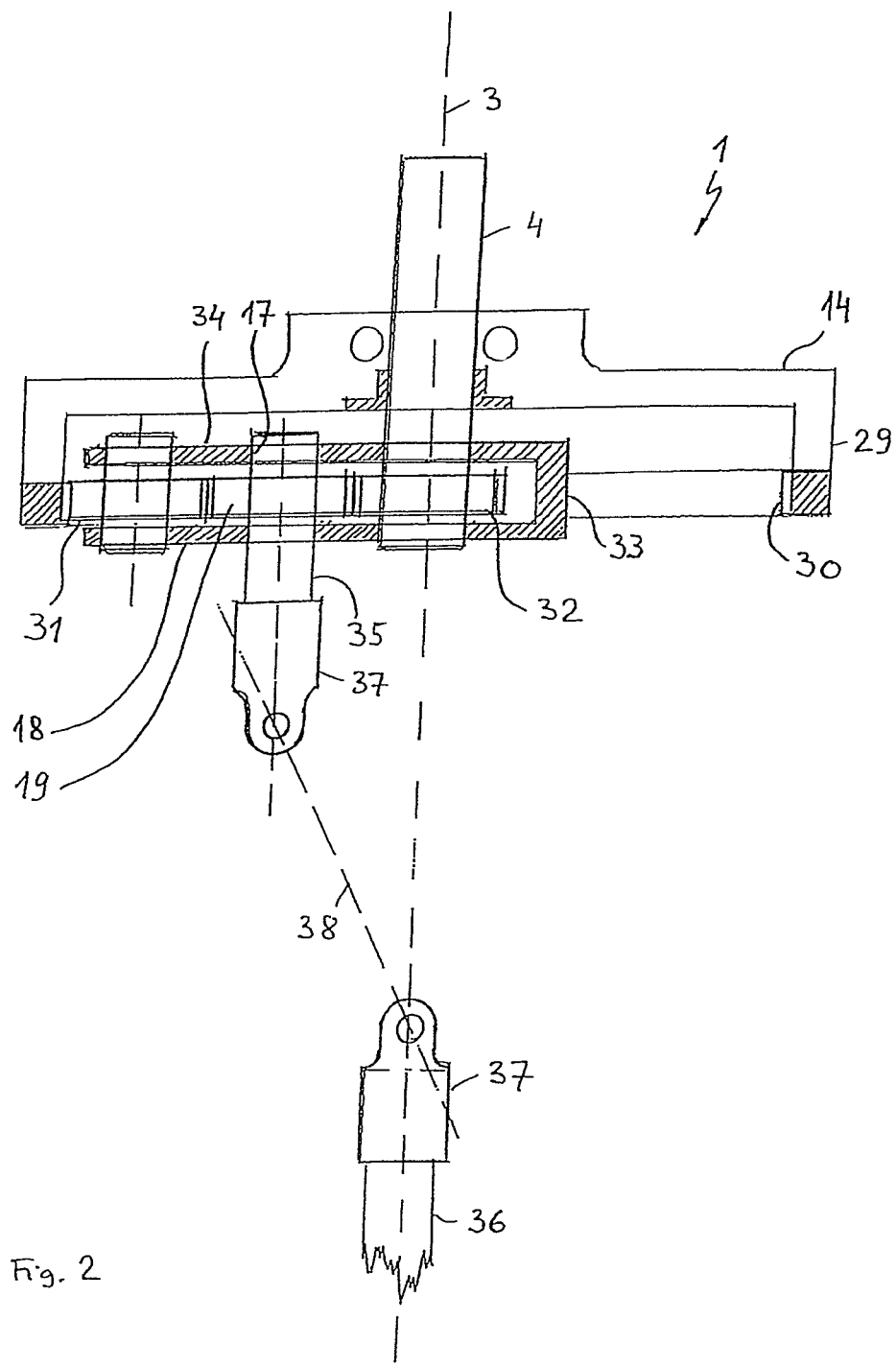
Figure 3:
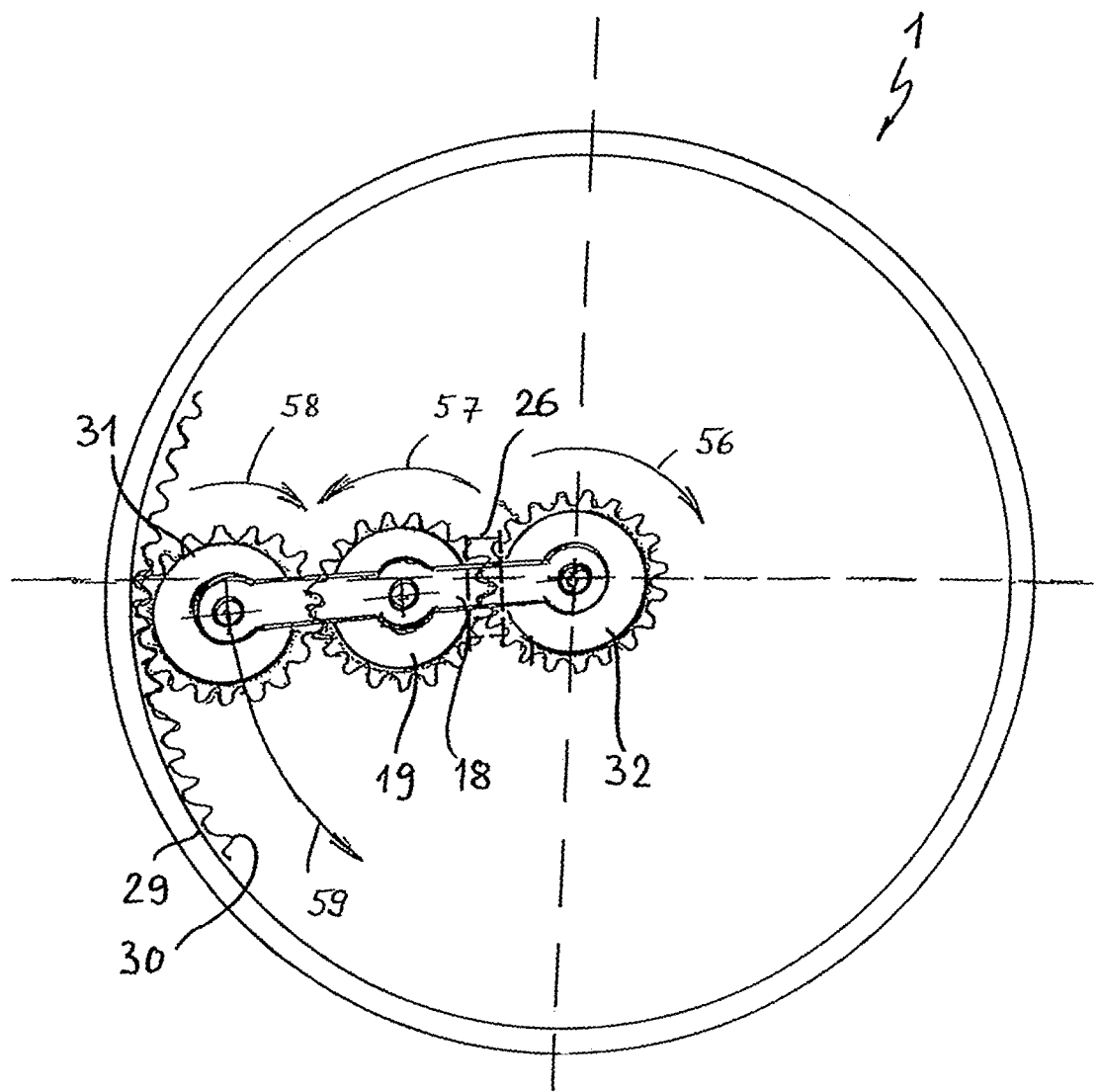
Figure 4:
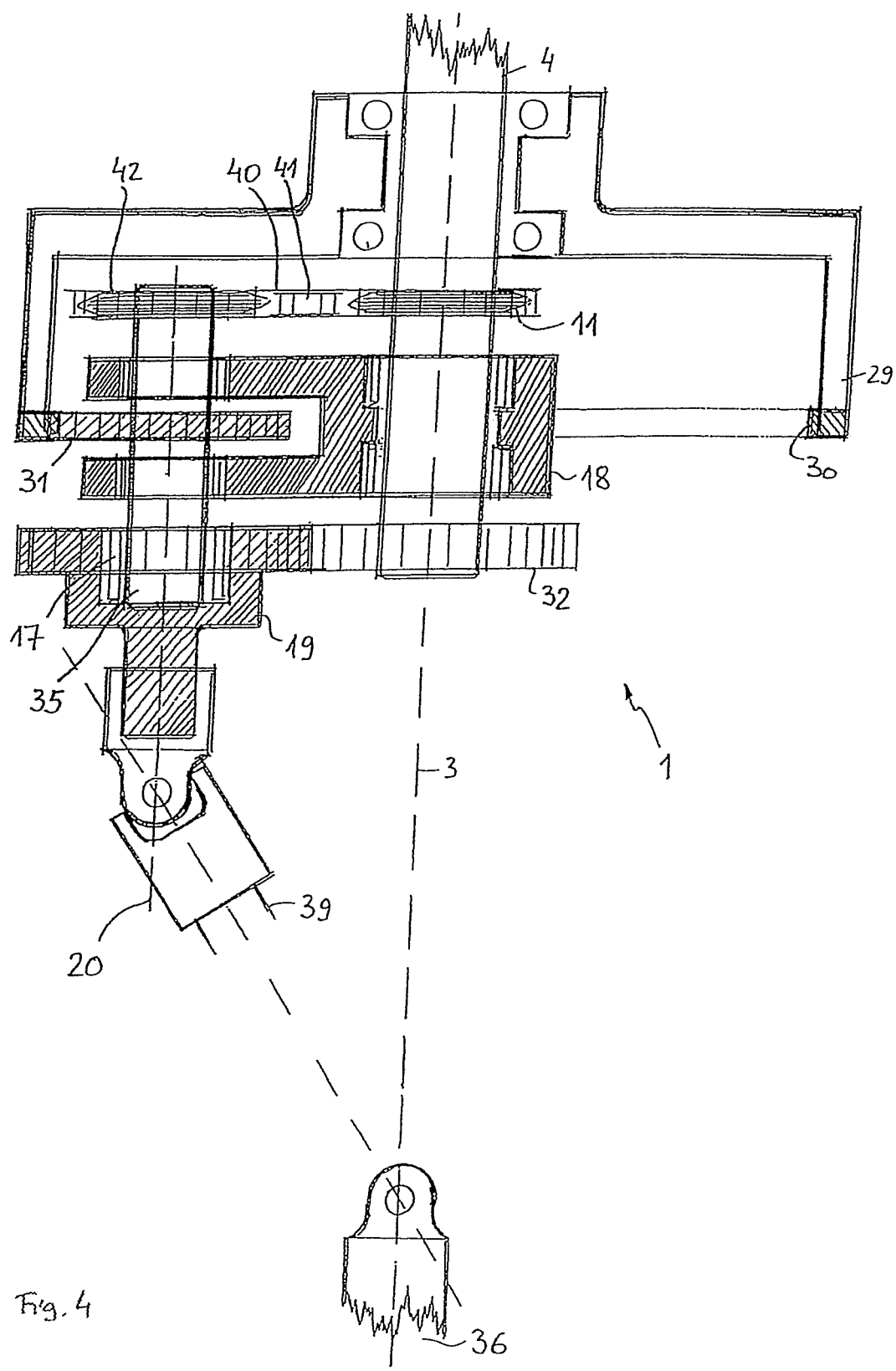
Figure 5:
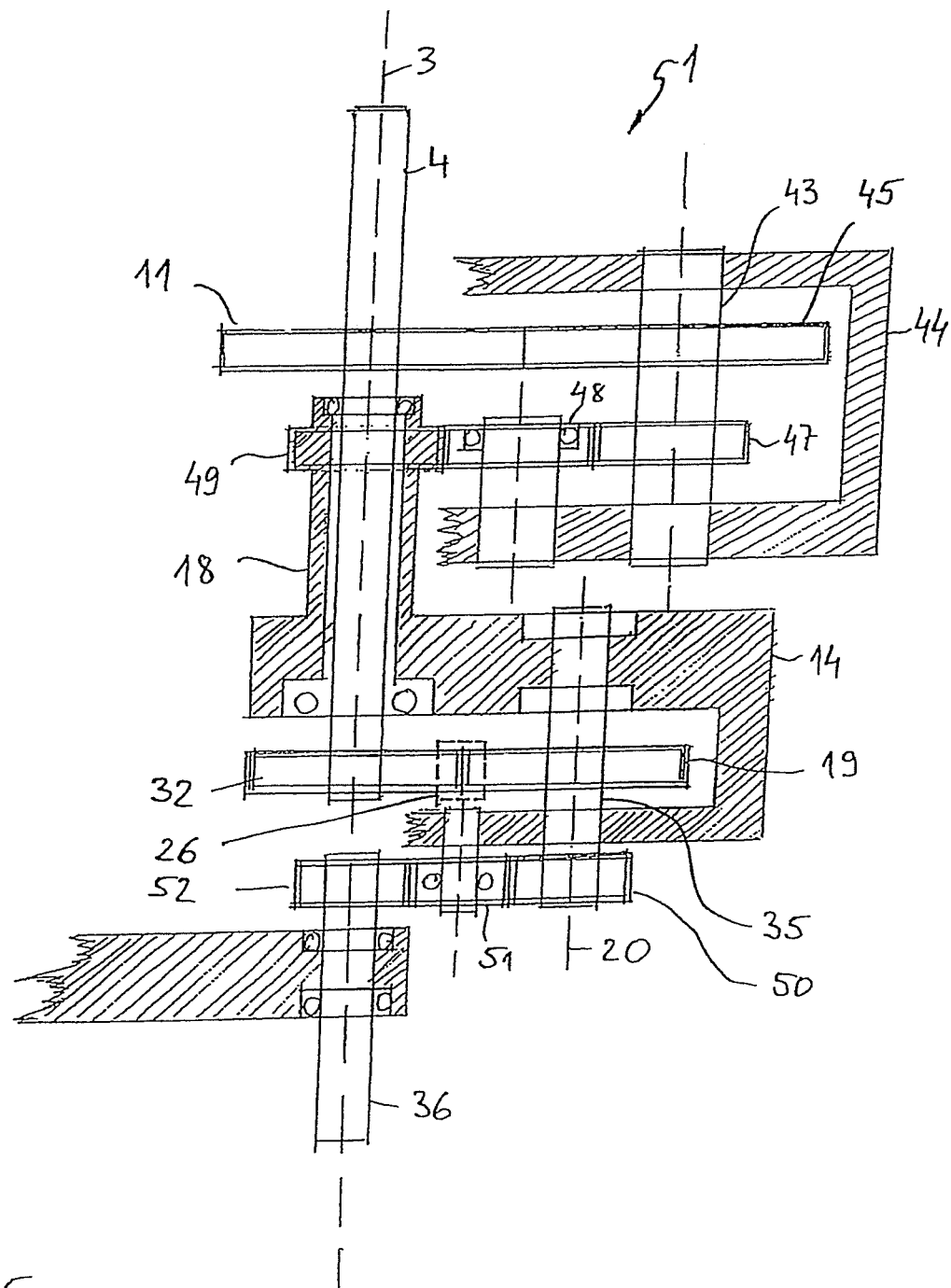
Figure 6:
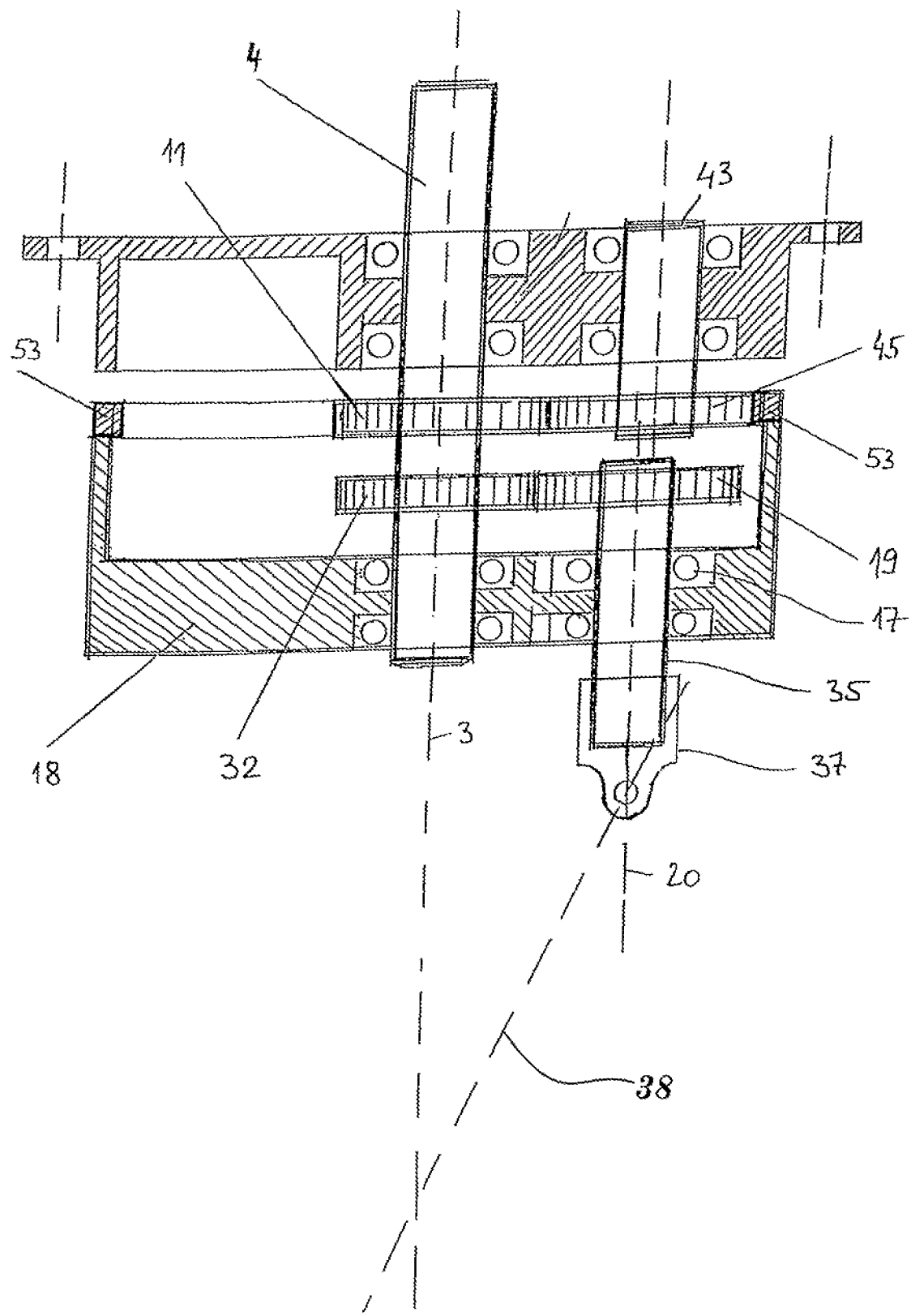
Figure 7:
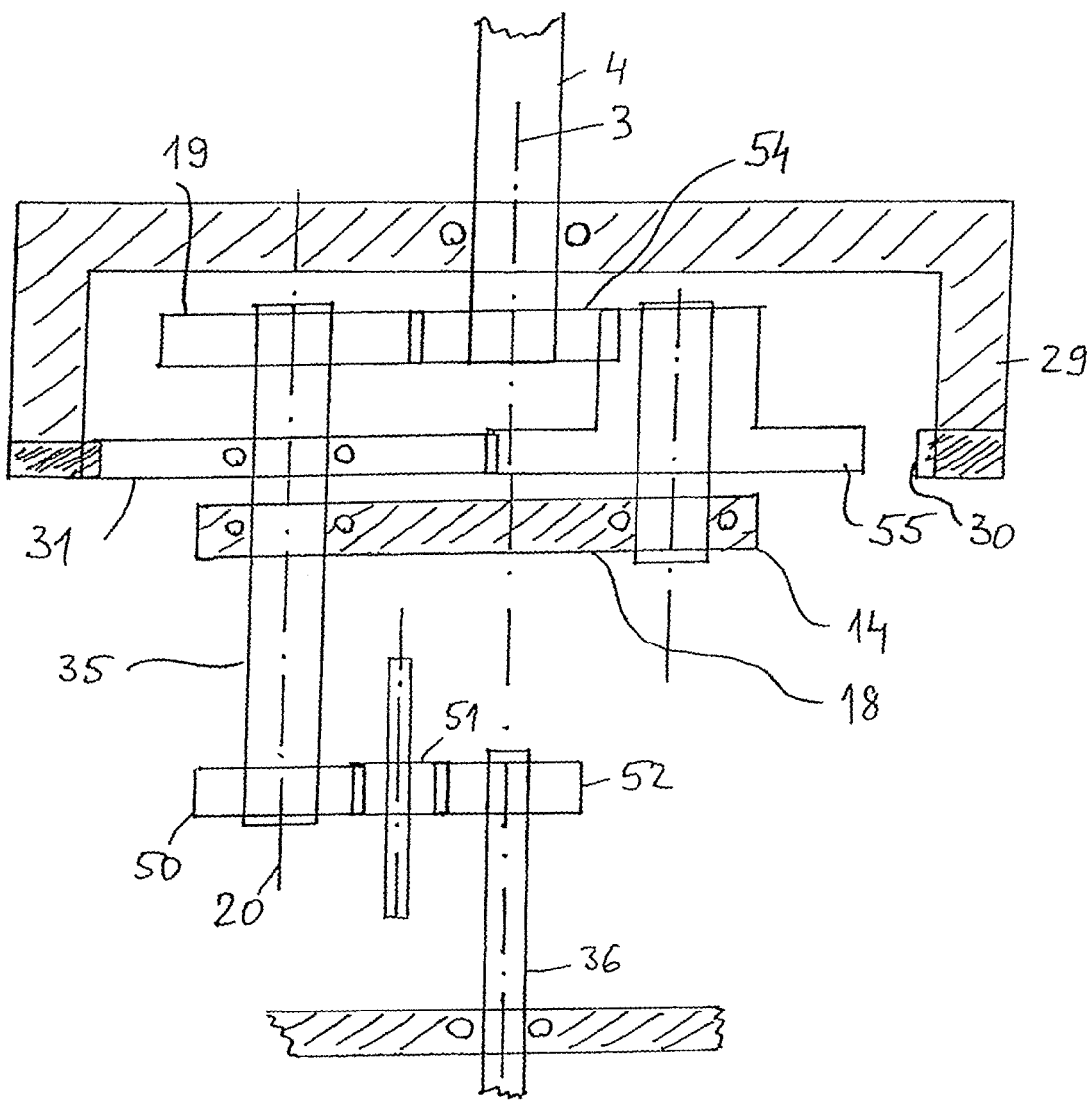

The invention is explained in more detail with reference to the exemplary embodiments depicted in the drawing. In the Figures:

FIG. 1 schematically shows a first exemplary embodiment of the transmission according to the invention;

FIG. 2 schematically shows a second exemplary embodiment in a longitudinal section;

FIG. 3 shows the second exemplary embodiment with small modifications in a top view;

FIG. 4 schematically shows a third exemplary embodiment in a longitudinal section;

FIG. 5 schematically shows a fourth exemplary embodiment in a longitudinal section;

FIG. 6 schematically shows a fifth exemplary embodiment in a longitudinal section;

FIG. 7 schematically shows a sixth exemplary embodiment in a longitudinal section;

FIG. 8 shows a first exemplary embodiment of the transmission according to the invention with two transmission inputs; and FIG. 9 shows a second exemplary embodiment of the transmission according to the invention with two transmission inputs.

FIG. 1 shows a transmission designated in its entirety with 1. The transmission 1 has a transmission input comprising a crank pin 10. A transmission-side end of a connecting rod 2, which is only partially depicted here, is seated on the crank pin 10. The connecting rod 2 is part of a drive (not shown) for the transmission 1, which generates an oscillating rotational movement of a bearing drive gearwheel 11 via the crank pin 10. The oscillating rotational movement (reciprocating movement) is illustrated by the semi-circular double-headed arrow 12.

The bearing drive gearwheel 11 has an external toothing 13, which is in engagement with a gearwheel bearing drive 14. In this case, the external toothing 13 meshes with a toothed rack 15 of the gearwheel bearing drive 14. The oscillating circular movement according to the double-headed arrow 12 is converted into an oscillating, but now linear, movement of the gearwheel bearing drive 14 by the cooperation of the toothed rack 15 and the external toothing 13 of the bearing drive gearwheel 11. The oscillating linear movement of the gearwheel bearing drive 14 is marked with the double-headed arrow 16.

The gearwheel bearing drive 14 serves for moving a gearwheel bearing 17 provided between a gearwheel carrier 18 and a main gearwheel 19. Thus, the gearwheel bearing 17 is moved by the gearwheel bearing drive 14 in a reciprocating manner in accordance with the double-headed arrow 16. The gearwheel bearing 17 determines the position of a rotation axis 20 of the main gearwheel 19.

In addition, the external toothing 13 of the bearing drive gearwheel 11 is in engagement with a gearwheel drive 21. The gearwheel drive 21 has a first toothed rack 22 meshing with the external toothing 13 of the bearing drive gearwheel 11. A second toothed rack 23 meshes with an external toothing 24 of the main gearwheel 19. Due to the oscillating rotational movement of the bearing drive gearwheel 11 in accordance with the semi-circular double-headed arrow 12, the gearwheel drive 21 executes a linear, reciprocating movement in accordance with the double-headed arrow 25.

If the stationary bearing drive gearwheel 11 is rotated counter-clockwise by the connecting rod 2, the gearwheel bearing drive 14 is moved downwards and the gearwheel drive 21 upwards at the same time in the illustration of FIG. 1. Said engagement between the second toothed rack 23 of the gearwheel drive 21 and the external toothing 24 of the main gearwheel 19 occurs in an engagement zone 26 (see dashed rectangle). Due to the downward movement of the gearwheel bearing drive 14, the engagement zone 26 is also moved downwards. At the same time, however, the second toothed rack 23 or the gearwheel drive 21 are moved upwards, so that the main gearwheel 19 rotates twice as fast as the bearing drive gearwheel 11, provided that the diameters of the two gearwheels 11, 19 are of the same size. An arrow 27 symbolizes the direction of rotation (counter-clockwise) if the bearing drive gearwheel 11 is rotated counter-clockwise. In this case, the arrow 28 shows the direction of movement of the engagement zone 26. The circumferential movement 27 of the main gearwheel 19 in the engagement zone 26 is in this case opposite to the movement 28 of the engagement zone 26. While the circumferential movement in accordance with the arrow 27 in the engagement zone substantially consists only of an upwardly directed component, the movement of the engagement zone in accordance with the arrow 28 points downwards.

Even though the diameters of the gearwheels 11, 19 are of the same size, the transmission 1 with the bearing drive 14 and the gearwheel drive 21 leads to a doubling of the speed of rotation of the main gearwheel 19 in relation to the speed of rotation of the bearing drive gearwheel 11.

Accordingly, an oscillating circular movement of the bearing drive gearwheel 11 can be converted by means of the transmission 1 of FIG. 1 into a rotation of the main gearwheel 19 that is twice as fast. For example, an electric generator may be provided, wherein the oscillating movement of the main gearwheel 19, increased by the factor of 2 compared with the movement of the bearing drive gearwheel 11, is converted into electrical energy. In addition, the oscillating movement of the main gearwheel could be converted into a rotation in the same direction via corresponding freewheels.

Components or features that are similar or identical to components or features of FIG. 1 are provided with the same reference numerals in the following Figures.

FIGS. 2 and 3 show a second exemplary embodiment of the invention. The gearwheel bearing drive 14 includes a stationary ring gearwheel 29 with an internal toothing 30. Here, the transmission input includes an input shaft 4 rotatably mounted about a rotation axis 3 in the ring gearwheel 29. A circulating gearwheel 31, which is connected via the gearwheel carrier 18 to the main gearwheel 19 and a main drive gearwheel 32, meshes with the internal toothing 30 of the ring gearwheel 29. The main drive gearwheel 32 is seated non-rotatably on the input shaft 11. While the gearwheel carrier 18 in the transmission shown in FIG. 2 is ring-shaped and has two U-legs 34 connected to each other by a U-base 30, the gearwheel carrier 18 in the slightly modified version according to FIG. 3 has two rods that are not connected to each other by a U-base.

As is apparent from FIG. 2, the main gearwheel 19 is non-rotatably disposed on a carrier shaft 35 which is rotatably mounted in the gearwheel carrier 18. The gearwheel bearing 17 provided between the gearwheel carrier 18 and the carrier shaft 34 may be configured as a slide bearing or is not shown separately in FIG. 2.

The rotation of the main gearwheel 19 of the carrier shaft 34 is transmitted on to an output shaft 36 via a cardan shaft not illustrated in any more detail in FIG. 2. FIG. 2 shows universal joint parts 37 between which, in accordance with the dashed line 38, the cardan shaft extends.

If the main drive gearwheel 32 is rotated clockwise in accordance with an arrow 56 (see FIG. 3), the main gearwheel 19 is thereby driven counter-clockwise in accordance with the arrow 57. Due to the rotation of the main gearwheel 19, the circulating gearwheel 31 in turn rotates clockwise in accordance with the arrow 58 and, because of the engagement with the internal toothing 30 of the ring gearwheel 29, causes the gearwheel carrier 18 to rotate counter-clockwise (see arrow 59) about the rotation axis 3. Thus, the gearwheel bearing 17 between the gearwheel carrier 18 and the main gearwheel 19 is also moved counter-clockwise. Also, the engagement zone 26 of the engagement between the main drive gearwheel 32, which constitutes the gearwheel drive or is a part thereof, and the main gearwheel 19 is moved counter-clockwise. Thus, the movement of the engagement zone 26 is opposite to the circumferential movement of the main gearwheel 19 in the engagement zone 26. This results in an increase in the speed of rotation of the main gearwheel 19 compared with the speed of rotation at which the input shaft 4 or the main drive gearwheel 32 rotate, even though the diameters of the gearwheels 19, 32 are of the same size. Accordingly, the output shaft 36 rotates faster than the input shaft 4 (see FIG. 2).

If a torque is now input not via the input shaft 4, but via the output shaft 36, the main gearwheel 19 now constitutes the driving gearwheel. Assuming that the torque input by the output shaft 36 acts in a counter-clockwise direction in accordance with the arrow 57 in FIG. 3, this in turn causes a rotational movement of the gearwheel carrier 18 in a counter-clockwise direction (see arrow 59). In the process, however, no or no appreciable torque can be transmitted from the main gearwheel 19 on to the gearwheel 32, because the main gearwheel 19 with the gearwheel carrier 18 can now simply circulate on the external toothing of the gearwheel 32 (which is stationary or rotates only with resistance) without outputting torque in the process. As a result, the transmission of FIGS. 2 and 3 constitutes a freewheel transmission which transmits torque only from the input shaft on to the output shaft, but not in the opposite direction, i.e. from the output shaft 36 on to the input shaft 4.

FIG. 4 shows another exemplary embodiment of the transmission 1 according to the invention. Also in this case, the connection between the main gearwheel 19 and the output shaft 36 is realized by means of said cardan shaft 39, which is only suggested in FIG. 4.

Here, the bearing drive gearwheel 11 is configured as the first chain gearwheel of a chain drive 40. The chain drive 40 further comprises a chain 41 and a second chain wheel 42 non-rotatably seated on the carrier shaft 35. Furthermore, the circulating gearwheel 31, which also meshes with the internal toothing 30 of the stationary ring gearwheel 29 here, is disposed on the carrier shaft 35 between the main gearwheel 19 and the second chain gearwheel 42. The chain drive is located within the ring gearwheel 29.

When a driving torque is inputted into the input shaft 4, the circulating gearwheel 31 is driven on the one hand and, on the other hand, the main gearwheel 19 via the main drive gearwheel 32. Because of the main drive gearwheel 32, the main gearwheel 19 is made to carry out its own rotation, i.e. the main gearwheel 19 rotates about the rotation axis 20. Here, the main gearwheel 19 is rotatably disposed on the carrier shaft 35. The gearwheel bearing 17, which in this case is configured as a roller bearing (needle bearing), can be seen between the main gearwheel 19 and the carrier shaft 35. Through the bearing drive gearwheel 11, the chain drive 40 and the circulating gearwheel 31, a rotation of the carrier shaft also takes place about the rotation axis 3 of the input shaft 4. The rotation of the main gearwheel 17 about the rotation axis 20 and the rotation of the carrier shaft 35 with the main gearwheel 17 about the rotation axis 3 causes a resultant rotation of the main gearwheel 19 which is increased compared with the rotation of the main drive gearwheel 32, which is supposed to have the same diameter as the main gearwheel 19. Of course, the diameters of the main gearwheel 19 and the main drive gearwheel may also be different. Also in this case, however, the main gearwheel 19 reaches a speed of rotation greater than the product of the speed of rotation of the main drive gearwheel 32 and the diameter ratio of the two gearwheels 19, 32.

FIG. 5 shows another exemplary embodiment of the transmission 1 according to the invention. The gearwheel bearing drive 14 comprises a countershaft 43 which extends parallel to the input shaft 4 and is rotatably mounted in place in a housing part 44 of the transmission 1. A gearwheel 45, which meshes with the bearing drive gearwheel 11 on the input shaft 4, is non-rotatably disposed on the countershaft 43. The rotation of the countershaft 43 is transmitted via a further gearwheel 47 and an intermediate gearwheel 48 on to a sprocket 49 of the gearwheel carrier 18. In this case, the gearwheel carrier 18 is rotatably mounted on the input shaft 4. Because of the constellation with the intermediate gearwheel 48, the gearwheel bearing 18 rotates in the opposite direction to the input shaft 4.

The gearwheel carrier 18 ensures that the carrier shaft 35 mounted in it circulates about the rotation axis 3 of the input shaft 4. The main gearwheel 19 disposed on the carrier shaft 35 is driven by the main drive gearwheel 32. Also in this case, the engagement zone 26 between the main drive gearwheel 32 and the main gearwheel 19 is moved on a circular trajectory about the rotation axis 20 due to the rotation of the gearwheel carrier 18. In the process, the movement of the engagement zone 26 is opposite to the circumferential movement of the main gearwheel 19 in the engagement zone 26. For example, while the circumferential rotation direction of the main gearwheel 19 in the engagement zone 26 runs into the plane of the drawing, the gearwheel carrier 18, and thus also the engagement zone 26, is moved out of the plane of the drawing.

Instead of the cardan shaft 39, an output gearwheel 50, which is non-rotatably seated on the carrier shaft 35, is provided here for the connection between the main gearwheel 19 or the carrier shaft 35 and the output shaft 36. The output gearwheel 50 meshes with an intermediate gearwheel 51, which in turn meshes with a fixed gearwheel 52 on the output shaft 36. However, it should be emphasized that the cardan shaft with the universal joint parts 37 may be used instead of the gearwheels 50, 51, 52.

The exemplary embodiment of FIG. 6 also has a countershaft 43 routed parallel to the input shaft 4. The gear wheel 45, which meshes with the bearing drive gearwheel 11 of approximately the same size on the input shaft 4, is also in engagement with an internal toothing 53 of the circulating gearwheel carrier 18. In this case, the gearwheel carrier 18 substantially takes the shape of a ring gearwheel.

Via the main drive gearwheel 32, which is non-rotatably disposed on the input shaft 4, the main gearwheel 19 is driven so that it rotates about the rotation axis 20. At the same time, the gearwheel bearing drive 18 is made to rotate via the bearing drive gearwheel 11, which is also non-rotatably disposed on the input shaft 4. As a result, the gearwheel bearing 17, and thus the carrier shaft 35 and the main gearwheel 19 non-rotatably disposed thereon rotate about the rotation axis 3 of the input shaft 4. The torque present on the carrier shaft 35 can be transmitted via the universal joint part 37, which is attached to the carrier shaft 35, to the output shaft, which is not shown in FIG. 6.

In the exemplary embodiment of FIG. 7, a gearwheel 54 non-rotatably disposed on the input shaft 4 is provided, which fulfils both the function of the bearing drive gearwheel and the function of the main drive gearwheel. On the one hand, the gearwheel 54 meshes with the main gearwheel 19 on the carrier shaft 35 and, on the other hand, drives a stepped gearwheel 55 of the gearwheel bearing drive 14. The stepped gearwheel 55, which does not have to be stepped but has to have a certain axial length, is in engagement with the circulating gearwheel 31, which in turn meshes with the internal toothing 30 of the stationary ring gearwheel 29. Thus, the gearwheel carrier 18 rotates about the rotation axis 3 of the input shaft 4. At the same time, the carrier shaft 35 rotates about the rotation axis 20. Again, the resultant rotation of the main gearwheel 19 or of the carrier shaft 35 is composed of the own rotation about the rotation axis 20 and the rotation of the gearwheel carrier 18.

The connection between the carrier shaft 35 and the output shaft 36 is realized in this case with the gearwheel set comprising the gearwheels 50, 51, 52. As an alternative, a connection via the cardan shaft would be possible.

FIG. 8 shows an embodiment of the transmission according to the invention with the input shaft 4 rotating about the rotation axis 3. The main drive gearwheel 32, which meshes with an internal toothing 60 of the main gearwheel 19, is integrally molded onto the shaft 4. A rotation axis 61 of the main gearwheel 19 is spaced apart from the rotation axis 3 of the input shaft, which is marked by an eccentricity 62. A shaft section 63 of the main gearwheel 19 can be connected by means of a cardan drive, which here is only indicated by a dashed line, in order to transmit the rotation of the main gearwheel 19 on to the rotation axis 3. In this embodiment, the eccentricity 62 may be designed to be minimal and run towards zero. Nevertheless, the gearwheels may be of any size in order to transmit large forces.

The rotation of the main gearwheel 19 is composed of the own rotation about the rotation axis 61 and a rotation of the gearwheel carrier 18 about the rotation axis 3, wherein the gearwheel carrier 18 forms the gearwheel bearing 17, which is disposed eccentrically relative to the rotation axis 3, for the shaft section 63. The gearwheel carrier 18 has a peripheral toothing 64 cooperating with a second transmission input 65 (only suggested herein). For example, the second transmission input 65 may include a gearwheel meshing with the toothing 64. Bearings 66 provide for a rotary mounting of the gearwheel carrier 18.

If the first input shaft is coupled with a first transmission input and driven clockwise, for instance, the main gearwheel 19 also rotates clockwise. If the gearwheel carrier 18 does not rotate but is fixed in its position, the position of the engagement zone 26 between the main gearwheel 19 and the main drive gearwheel 32 remains unchanged. However, if the gearwheel carrier 18 is also driven clockwise, the main gearwheel 19 including the shaft section 63 rotates about both the rotation axis 61 and the rotation axis 3. The rotation axis 61 is therefore not stationary but executes a rotational movement about the rotation axis 3. In total, the main gearwheel 19 rotates faster about the rotation axis than if the gearwheel carrier 18 is fixed.

FIG. 9 shows another exemplary embodiment. In contrast to the exemplary embodiment of FIG. 8, the main gearwheel 19 with the shaft section 63 has an external toothing, so that a clockwise rotational movement of the input shaft 4 results in an opposite rotation of the main gearwheel 19, i.e. counter-clockwise. In order to achieve an acceleration of the output, in this case a rotation about the rotation axis 3, the gearwheel carrier 18 also has to be driven clockwise. In this exemplary embodiment, a movement of the engagement zone 26 is opposite to the circulating movement of the main gearwheel 19 in the engagement zone 26.

LIST OF REFERENCE NUMERALS

1 Transmission
2 Connecting rod
3 Rotation axis
4 Input shaft
10 Crank pin
11 Bearing drive gearwheel
12 Double-headed arrow
13 External toothing
14 Gearwheel bearing drive
15 Toothed rack
16 Double-headed arrow
17 Gearwheel bearing
18 Gearwheel carrier
19 Main gearwheel
20 Rotation axis
21 Gearwheel drive
22 First toothed rack
23 Second toothed rack
24 External toothing
25 Double-headed arrow
26 Engagement zone
27 Arrow
28 Arrow
29 Ring gearwheel
30 Internal toothing
31 Circulating gearwheel
32 Main drive gearwheel
33 U-base
34 U-leg
35 Carrier shaft
36 Output shaft
37 Universal joint part
38 Dashed line
39 Cardan shaft
40 Chain drive
41 Chain
42 Second gearwheel
43 Countershaft
44 Housing part
45 Gearwheel
46 Gearwheel
47 Gearwheel
48 Intermediate gearwheel
49 Pinion
50 Output gearwheel
51 Intermediate gearwheel
52 Fixed gearwheel
53 Internal toothing
54 Gearwheel
55 Stepped gearwheel
56 Arrow
57 Arrow
58 Arrow
59 Arrow
60 Internal toothing
61 Rotation axis
62 Distance
63 Shaft section
64 Toothing
65 Second transmission input
66 Bearing

What is claimed is:

1. A transmission comprising:
a first transmission input;
a second transmission input;
a transmission output;
a main gearwheel rotatably mounted about a rotation axis;
a gearwheel bearing assigned to the main gearwheel that can be moved perpendicularly to the rotation axis;
a gearwheel drive, which serves for rotating the main gearwheel about the rotation axis, wherein the main gearwheel is in engagement in an engagement zone with the gearwheel drive and a gearwheel bearing drive, which moves the gearwheel bearing;
wherein, when a first torque is input at the first transmission input, the gearwheel drive rotates the main gearwheel about the rotation axis;
wherein a second torque on the second transmission input drives the gearwheel bearing drive, whereby the position of the engagement zone is changed;
wherein movement of the engagement zone and circumferential movement of the main gearwheel in the engagement zone are oriented in the opposite or the same direction.

2. The transmission of claim 1, wherein the gearwheel bearing drive causes a circular movement of the gearwheel bearing, wherein rotation of the main gearwheel about the rotation axis and the circular movement of the gearwheel bearing have the same direction of rotation.

3. The transmission of claim 1, wherein the gearwheel bearing drive comprises a rotating gearwheel carrier.

4. The transmission of claim 3, further comprising a carrier shaft rotatable relative to the rotating gearwheel carrier with the main gearwheel seated on the carrier shaft.

5. The transmission of claim 1, wherein the gearwheel bearing drive is in engagement with a bearing drive gearwheel seated on an input shaft.

6. The transmission of claim 5, wherein the bearing drive gearwheel comprises a chain gearwheel.

7. The transmission of claim 1, wherein the gearwheel bearing drive comprises a stationary ring gearwheel and a circulating gearwheel meshing with the stationary ring gearwheel.

8. The transmission of claim 5, wherein the gearwheel bearing drive has a countershaft with a stationary rotation axis, which extends parallel to the input shaft and carries a gearwheel meshing with the bearing drive gearwheel on the input shaft.

9. The transmission of claim 8, wherein the gearwheel meshing with the bearing drive gearwheel meshes with an internal toothing of the gearwheel carrier.

10. The transmission of claim 5, wherein the bearing drive gearwheel meshes with the main gearwheel.

11. The transmission of claim 1, wherein the main gearwheel is connected to the transmission output via a cardan shaft.

12. The transmission of claim 1, wherein an intermediate gearwheel is provided between the main gearwheel and an output shaft, so that the main gearwheel and the output shaft rotate in the same direction of rotation.

13. The transmission of claim 1, wherein when a torque is input at an output side, the main gearwheel substantially imparts no torque to the gearwheel drive.

* * * * *